Dec. 3, 1957 K. BRYNES 2,815,499
MAGNETIC FIELD DETECTOR
Filed Feb. 23, 1956

Inventor:
Kermit Brynes
by, Richard E. Hosley
His Attorney

United States Patent Office 2,815,499
Patented Dec. 3, 1957

2,815,499
MAGNETIC FIELD DETECTOR

Kermit Brynes, Salem, Mass., assignor to General Electric Company, a corporation of New York Application February 23, 1956, Serial No. 567,150

11 Claims. (Cl. 340—197)

This invention relates to magnetic field detectors and more particularly to compass transmitters for providing magnetic information in the form of electrical signals.

One form of magnetic field detector commonly employed in the measurement of external unidirectional magnetic fields, such as that of the earth, may consist of an annular core of magnetic material on which are toroidally wound a primary excitation winding and a secondary polyphase winding. The function of the primary winding, when properly excited by an alternating current of sufficient magnitude, is periodically to saturate the annular core and, thereby, to vary the magnetic permeability of the core. When the unit is positioned within the earth's magnetic field, a portion of the external field will thread its way through the core separating itself into two parts traveling about opposite halves of the annular core. Because of the alternating current flux in the core, the amounts of the external field threading the core will vary, thereby producing a pulsating unidirectional flux which intercepts each portion of the polyphase winding, inducing therein a signal having twice the frequency of the excitation current. The patterns of such second harmonic signals in the secondary winding bear definite relationships to the direction of the external field, and various electrical receiving systems may be employed to utilize these magnetically characterized electrical signals either for indicating the strength and/or direction of the external field or for performing related functions such as slaving a directional gyro.

It can readily be seen that the direction of the alternating flux in the core structure of such a device is reversed every half cycle of the excitation current. So, although the core structure is saturated periodically at a frequency of twice the excitation current, a side effect is that the induced excitation flux in any given section of the core structure alternately aids and then opposes the unidirectional flux therein. As a natural result, the second harmonic signal induced in each segment of the polyphase winding is characterized by a dissymmetry between succeeding cycles, that is to say, the output signal will have a different wave form during the period when the saturating flux has the same direction as the unidirectional field than it will have during the interval when the saturating flux has an opposite direction. To put it still another way, the second harmonic signal will be mixed with fundamental and other odd harmonic signals not characteristic of the information to be obtained from the device. Still further amounts of odd harmonic signals are introduced into the secondary winding by flux linkages between the primary and secondary circuits resulting from the usual coaxial relationships between windings. Because these spurious odd harmonics do not characterize the desired information and disturb the operation of equipment designed to respond to second harmonic signals, the elimination of odd harmonic signals from devices of this character is an immense preoccupation of those concerned with the design of such instruments.

This problem has been approached in the past by different methods, one of which is to derive from a separate source a voltage of the right magnitude, frequency, and phase and to oppose it with the unwanted signal. Or again, the primary and secondary windings can be cross-connected in such a manner as to cause some of the spurious signals so induced to cancel themselves out. Both of these methods, it can be seen, not only involve considerable expense in the manufacture of the system, but also require the delicate balancing of sizable factors. Furthermore, both of these methods attempt to remove the spurious signals after they have entered the system instead of eliminating their source.

Accordingly, it is an object of this invention to provide a magnetic field detector of the second harmonic type having a physical and magnetic geometry substantially eliminating the introduction of odd harmonic signals into the output circuit.

By way of a brief summary of one aspect of this invention, there is provided an earth's field detector having a magnetically permeable structure in the form of a hollow toroid. Within the hollow toroidal core and coaxial therewith is situated a solenoidal excitation winding to be energized by an alternating current signal of a strength sufficient periodically to saturate the core structure with magnetic flux. The saturating flux, by reason of this construction, circulates in the core structure in directions circumferential with respect to a minor element of the toroid. Outside the core structure three polyphase winding segments are equally spaced so that each surrounds a portion of the core in toroidal fashion, being essentially coaxial with the induced saturating flux. Should the detector be suspended in the earth's magnetic field, or for that matter in any external unidirectional field, such that at least a component of the field lies in a plane parallel to that of the core structure, a portion of the external field will thread through the permeable core dividing itself along two paths circumventing opposite halves of the toroid. Thus, the flux within the core structure resulting from the unidirectional field will be substantially perpendicular at all points with respect to the alternating saturating flux.

While the scope of this invention is not to be limited, except by a fair construction of the appended claims, the details of the invention, as well as further objects and advantages, may best be understood in connection with the drawings annexed hereto, in which:

Figure 1:
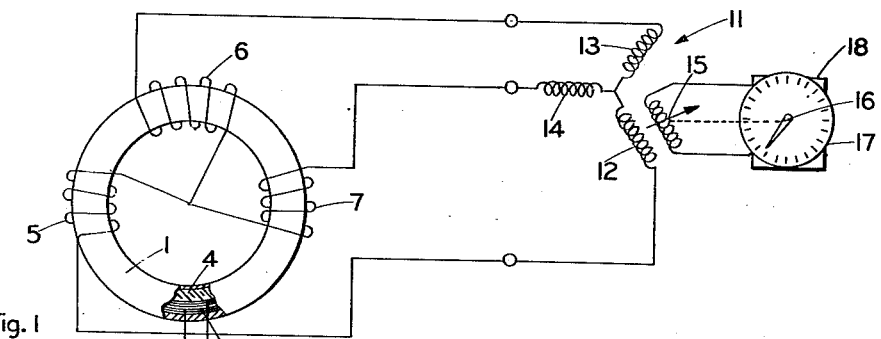
Figure 1 is a diagrammatic view, partially cut away, of an earth's field detector constructed in accordance with the principles of this invention and connected to a known type of receiver.

An earth's field detector constructed in accordance with the principles of this invention is illustrated in Figure 1 as comprising a hollow toroidal core structure 1 formed in two sections of a material having a relatively high magnetic permeability such, for example, as mu-metal or supermalloy. Sandwiched within the core structure and shown in the cutaway portion is a solenoidal excitation coil 2 having input terminals 3 and wound on a ceramic coil form 4. Positioned externally of the core structure and enveloping separate portions thereof are polyphase winding segments 5, 6 and 7, shown connected in Y. This magnetic field detector, or compass transmitter, is positioned horizontally, in the usual case, within the earth's magnetic field and the excitation winding 2 is energized by an alternating current signal of sufficient strength periodically to saturate the core structure with magnetic flux.

Figure 2:
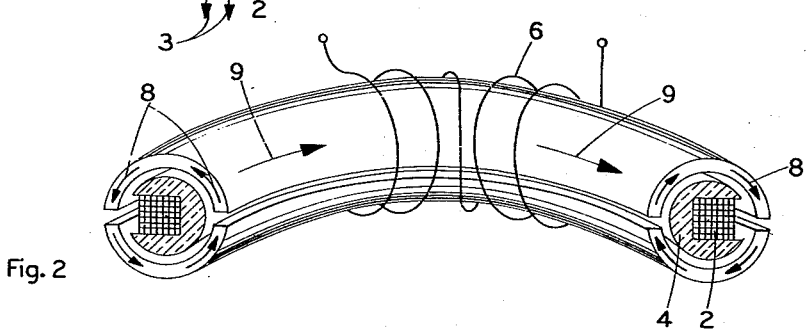
Figure 2 is a cross-sectional perspective view of a portion of the detector shown in Figure 1; and, Figure 3 represents a perspective view of a modification of the detector shown in Figure 1.

The saturating fluxes thus induced in the core structure will have directions circumferential of the core with respect to a cross section taken on any diameter, as suggested by arrows 8 in Figure 2. In other words, any plane including the axis of revolution of the toroid will intersect the toroid itself parallel with the directions of the saturating flux at the point of intersection. The flux induced in the core structure by the external unidirectional field, however, will divide into halves, each of which will traverse the core structure along a path having a direction suggested by the arrows 9. It may readily be seen therefore that the directions of these two fluxes are substantially perpendicular throughout the core structure, a feature of great significance in the practice of this invention. The natural result of the periodically varying excitation flux is to vary the permeability of the core structure from a maximum value to one approximating the air core, or minimum, value twice during each cycle of excitation current. The amount of external flux intercepted by the core structure will, therefore, pulsate, producing in each of the external winding segments 5, 6 and 7 a double frequency signal. The amplitude and phase relationships of the signals in each of the segments will vary depending upon the orientation of the telemetering unit with respect to the external field, and the total effect will be to produce a synchro-type position-characterized signal pattern which may be analyzed in several known ways. Figure 1 shows the telemetering unit connected to a selsyn-type receiver 11 comprising three-phase winding segments 12, 13 and 14 connected to repeat the signal pattern produced by the compass transmitter. The rotor winding 15 is rotated by a null-seeking servo system 18 until the signal produced therein is at a minimum. Its position, then, which may be indicated by pointer 16 on scale 17, is a function of the direction of the earth's magnetic field.

It is uncommonly appreciated that the permeability experienced by a magnetic field acting in a given direction within a magnetic material may be influenced by the presence in the material of another field acting in a different, even orthogonal, direction. In the construction of the unique compass transmitter just described, I have made use of this principle in a device inherently free from many of the defects inherent in prior arrangements having the same purposes. Since the alternating saturating flux within the core structure is at all times substantially perpendicular to the unidirectional field therein, a very important source of spurious odd harmonic signals has been eliminated. This is readily appreciated when it is seen that, in contrast with prior devices wherein the excitation flux alternately aided and opposed the unidirectional field within the core structure, the unidirectional flux threading the core structure of a transmitter constructed in accordance with my invention is neither is neither added to nor subtracted from the excitation flux. Rather, because of the perpendicularity of these two fluxes, the alternating excitation flux exerts no other influence upon the unidirectional flux than to vary the permeability of the core material, and this effect will obviously be identical during each half cycle of excitation current.

Still another source of odd harmonic signals is eliminated by the unique placement of windings. Since the turns of the output windings are substantially concentric with the excitation flux, flux linkages between primary and secondary windings are virtually eliminated. Consequently, instead of eliminating odd harmonics after their appearance within the device, these spurious signals have been excluded at their very source. The difference resides in the removal of the cause rather than the effect.

Figure 3:
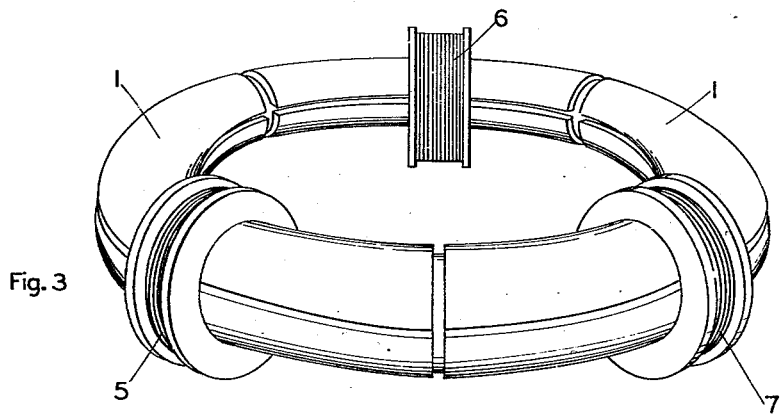

Figure 3 illustrates an alternate construction of the improved compass detector described above. Here the core structure 1 is shown as comprised of six substantially identical sub-sections, a construction particularly advantageous where the core is formed of an anisotropic material such as Mumetal or supermalloy. These and other materials of a similar nature exhibit a marked grain orientation having a distinct effect upon the magnetization properties. With the construction of Figure 3, each subsection can be given substantially symmetrical grain orientations, thereby reducing the effect of inhomogeneities on the signal output.

Modifications other than those shown and described may be constructed in accordance with the teachings of this invention. Although the core structure should form a substantially closed flux path about a central axis, the shape of the device need not be circular as in the case of a toroid, but may be delta shaped or, for that matter, in the form of any regular polygon. The cross-sectional shape, too, is not limited to the circular shape shown, but may be of a variety of different forms. It should thus be apparent that the above described embodiments are illustrative in nature and that other changes, combinations and substitutions within the spirit and scope of this invention will occur to those versed in the art to which this invention pertains.

What I claim as new and desire to secure by Letters Patent of the United States is:

1. A magnetic field detector for generating electrical signals characteristic of a magnetic field in which it may be placed, comprising: a solenoidal electrical winding; a hollow toroidal core structure coaxially enveloping said winding and formed of a saturable magnetic material; means for supplying said solenoidal winding with electrical currents for inducing fluxes in said core structure and thereby altering the magnetic permeability of said core structure; and polyphase winding means so positioned with respect to said core structure that the winding turns thereof are substantially concentric with the fluxes induced by said solenoidal winding.

2. A magnetic field detector for generating electrical signals characteristic of a magnetic field in which it may be placed, comprising: a core structure formed of a saturable magnetic material defining a substantially closed geometrical figure encircling but not enveloping a central position, said core being hollow in cross section; excitation winding means arranged to produce when energized a circumferential magnetic flux in said core structure substantially orthogonal at all points with respect to the direction of encirclement of said central position; means for supplying to said excitation winding means periodically varying current of a strength sufficient periodically to saturate said core structure; and polyphase electrical winding means positioned on said core structure, the winding turns of which are substantially concentric with respect to the circumferential flux induced in said core structure by said excitation winding means.

3. A magnetic field detector for generating electrical signals characteristic of a magnetic field in which it may be placed, comprising: a core structure of a saturable magnetic material hollow in cross section, electrical conducting means disposed within said core structure to produce, when energized, a magnetic flux having directions within said core structure circumferential with respect to said cross section, means for supplying to said electrical conducting means periodically varying current of a strength sufficient periodically to saturate said core structure; and electrical winding means positioned on said core structure, the turns of said winding means being substantially concentric with the flux induced in said core structure by said electrical conducting means.

4. A magnetic field detector for generating electrical signals characteristic of a magnetic field in which it may be placed, comprising: a hollow core structure formed of a saturable magnetic material and defining an essentially closed flux path about a central axis; excitation winding means positioned within said core structure and arranged to produce, when energized, a magnetic flux in said core structure essentially perpendicular to the direction of said flux path about the central axis; means for supplying to said excitation winding means periodically varying current of a strength sufficient periodically to saturate said core structure; and second winding means positioned on said core structure coaxially with said flux path.

5. A magnetic field detector for generating electrical signals characteristic of a magnetic field in which it may be placed, comprising: a hollow toroidal core structure formed of a staturable magnetic material and encircling an axis of revolution; excitation winding means positioned within said core structure and arranged to produce fluxes in said core structure, when energized, having directions circumferential with respect to cross sections of said core structure taken on planes including said axis of revolution; means for supplying to said excitation winding means periodically varying current of a strength sufficient periodically to saturate said core structure; and polyphase winding means positioned on said core structure, the winding turns of which are substantially concentric with said fluxes.

6. A compass transmitter to be positioned within an external magnetic field comprising: a hollow core structure formed of a saturable magnetic material and defining an essentially closed flux path about a central axis; excitation winding means positioned within said core structure and arranged to produce, when energized, a magnetic flux in said core structure substantially perpendicular to the direction of said flux path; means for supplying periodically varying currents to said excitation winding means of a strength sufficient periodically to saturate said core structure; and polyphase winding means positioned on said core structure concentric with the direction of said closed flux path for deriving electrical signals characteristic of said magnetic field when said excitation winding means are supplied with said periodically varying currents.

7. A compass transmitter to be positioned within an external magnetic field, comprising: a hollow core structure formed of a readily saturable magnetic material and defining an essentially closed flux path; an electrical excitation winding positioned within said core structure and arranged to produce, when energized, a flux substantially perpendicular to the flux in said core structure resulting from the external magnetic field; means for supplying to said excitation winding periodically varying current of a strength sufficient periodically to saturate said core structure; and polyphase windings positioned on said core structure, the orientations of the central axes of which coincide with the direction of said flux path, whereby electrical signals characteristic of said magnetic field are induced in said polyphase windings when said excitation winding is supplied with said periodically varying current.

8. A compass transmitter to be operated in cooperation with an external magnetic field, comprising: a core structure formed of a saturable magnetic material and substantially in the form of a hollow toroid; excitation winding means enveloped by said core structure and arranged to produce in said core structure, when energized, a magnetic flux substantially circumferential with respect to a cross section taken on any single diameter of the core structure; means for suplying periodically varying current signals to said excitation winding means of a strength sufficient periodically to saturate said core structure with magnetic flux; polyphase winding means positioned on said core structure, the winding turns of which are substantially concentric with the flux produced by said excitation winding means, whereby electrical signals characteristic of said magnetic field are induced in said polyphase winding means when said excitation winding means is supplied with said periodically varying current.

9. A compass transmitter to be positioned within an external magnetic field, comprising: a hollow core structure formed of a saturable grain-oriented magnetic material and defining an essentially closed flux path about a central axis; said core structure being formed of a plurality of similarly shaped elements having their grain orientations symmetrically disposed about said central axis; excitation winding means poistioned within said core structure and arranged to produce, when energized, a magnetic flux in said core structure substantially perpendicular to the direction of said flux path; means for supplying periodically varying currents to said excitation winding means of a strength sufficient periodically to saturate said core structure; and polyphase winding means positioned on said core structure concentric with the direction of said closed flux path for deriving electrical signals characteristic of said magnetic field when said excitation winding means are supplied with said periodically varying currents.

10. A compass transmitter to be positioned within an external magnetic field, comprising: a hollow core structure formed of a readily saturable grain-oriented magnetic material and defining an essentially closed flux path; said core structure being formed of a plurality of similarly shaped elements having their grain orientations symmetrically disposed about said closed flux path; an electrical excitation winding positioned within said core structure and arranged to produce, when energized, a flux substantially perpendicular to the flux in said core structure resulting from the external magnetic field; means for supplying to said excitation winding periodically varying current of a strength sufficient periodically to saturate said core structure; and polyphase windings positioned on said core structure, the orientations of the central axes of which coincide with the direction of said flux path, whereby electrical signals characteristic of said magnetic field are induced in said polyphase windings when said excitation winding is supplied with said periodically varying current.

11. A compass transmitter to be operated in cooperation with an external magnetic field, comprising: a core strutcure formed of a saturable grain-oriented magnetic material and substantially in the form of a hollow toroid; said core structure being formed of a plurality of similarly shaped elements having their grain orientations symmetrically disposed about the center of said toroid, excitation winding means enveloped by said core structure and arranged to produce in said core structure, when energized, a magnetic flux substantially circumferential with respect to a cross section taken on any single diameter of the core structure; means for supplying periodically varying current signals to said excitation winding means of a strength sufficient periodically to saturate said core structure with magnetic flux; polyphase winding means positioned on said core structure, the winding turns of which are substantially concentric with the flux produced by said excitation winding means, whereby electrical signals characteristic of said magnetic field are induced in said polyphase winding means when said excitation winding means is supplied with said periodically varying current.

No references cited.